(12) United States Patent
Moreau et al.

(10) Patent No.: US 10,899,481 B2
(45) Date of Patent: Jan. 26, 2021

(54) DEVICE, SYSTEM AND METHOD FOR DOSING A PASTY FOOD PRODUCT WITH SOLID PIECES AND A SAUCE INTO A CONTAINER

(71) Applicant: NESTEC S.A., Vevey (CH)

(72) Inventors: Jean Moreau, Manerbe (FR); Tanja Dahlke, Cormeilles (FR); Dominique Levallois, Lisieux (FR)

(73) Assignee: Societe des Produits Nestle S.A., Vevey (CH)

( * ) Notice: Subject to any disclaimer, the term of this patent is extended or adjusted under 35 U.S.C. 154(b) by 27 days.

(21) Appl. No.: 16/308,894

(22) PCT Filed: Jun. 13, 2017

(86) PCT No.: PCT/EP2017/064466
§ 371 (c)(1),
(2) Date: Dec. 11, 2018

(87) PCT Pub. No.: WO2017/216197
PCT Pub. Date: Dec. 21, 2017

(65) Prior Publication Data
US 2019/0152629 A1 May 23, 2019

(30) Foreign Application Priority Data
Jun. 13, 2016 (EP) .................... 16174179

(51) Int. Cl.
*B65B 3/26* (2006.01)
*B65B 3/32* (2006.01)
(Continued)

(52) U.S. Cl.
CPC ............ *B65B 3/326* (2013.01); *A23C 9/13* (2013.01); *A23C 9/1307* (2013.01); *A23C 9/152* (2013.01);
(Continued)

(58) Field of Classification Search
CPC ............ B65B 3/326; B65B 2220/14; B65B 2039/009; B65D 3/00; A23C 9/152;
(Continued)

(56) References Cited

U.S. PATENT DOCUMENTS 3,347,287 A * 10/1967 Geber .................. B67D 1/0051
141/105
3,559,700 A * 2/1971 Erickson ............... B65B 39/004
141/9
(Continued)

FOREIGN PATENT DOCUMENTS

| EP | 1348340 | 10/2003 |
|---|---|---|
| EP | 1518465 | 3/2005 |

(Continued)

*Primary Examiner* — Nicolas A Arnett
(74) *Attorney, Agent, or Firm* — K&L Gates LLP

(57) ABSTRACT

The invention relates to a device for dosing into a container (2) a pasty food product including solid pieces and a sauce. The device comprises an metering nozzle (1) comprising a main outlet to which the pasty food product with solid pieces is provided by a first channel (13) of the nozzle (1), and at least two peripheral outlets situated at a periphery of the main outlet to which the sauce is provided by corresponding second channels (14). The device comprises a support (3) for holding a container (2) to be filled from the nozzle (1), and is configured so that the metering nozzle moves, relative to the support (3), following a path around a central axis of said support. A corresponding system and a method are also provided.

18 Claims, 3 Drawing Sheets

(51) Int. Cl.
| | | |
|---|---|---|
| *A23C 13/14* | (2006.01) | |
| *A23G 9/28* | (2006.01) | |
| *A23P 30/40* | (2016.01) | |
| *A23L 9/10* | (2016.01) | |
| *A23C 9/13* | (2006.01) | |
| *A23C 9/152* | (2006.01) | |
| *A23P 30/25* | (2016.01) | |
| *G01F 11/02* | (2006.01) | |
| *A23C 9/156* | (2006.01) | |
| *B65D 3/00* | (2006.01) | |
| *B65B 39/00* | (2006.01) | |

(52) U.S. Cl.
CPC ............ *A23C 9/156* (2013.01); *A23C 9/1524* (2013.01); *A23C 13/14* (2013.01); *A23G 9/282* (2013.01); *A23L 9/12* (2016.08); *A23P 30/25* (2016.08); *A23P 30/40* (2016.08); *B65D 3/00* (2013.01); *G01F 11/021* (2013.01); *A23C 2210/30* (2013.01); *A23C 2270/05* (2013.01); *B65B 2039/009* (2013.01); *B65B 2220/14* (2013.01)

(58) Field of Classification Search
CPC ......... A23C 9/156; A23C 9/13; A23C 9/1524; A23C 9/1307; A23C 13/14; A23C 2270/05; A23C 2210/30; G01F 11/021; A23P 30/25; A23P 30/40; A23L 9/12; A23G 9/282
See application file for complete search history.

(56) References Cited

U.S. PATENT DOCUMENTS

| | | | | |
|---|---|---|---|---|
| 4,184,613 | A * | 1/1980 | Kinney | A23G 9/282 141/105 |
| 5,713,209 | A * | 2/1998 | Hunchar | A23G 9/12 366/301 |
| 5,820,913 | A * | 10/1998 | Grassler | A23C 9/156 426/564 |
| 5,888,567 | A * | 3/1999 | Daouse | A23G 9/285 425/133.1 |
| 6,223,949 | B1 * | 5/2001 | Spencer | A23G 3/2015 137/605 |
| 6,231,902 | B1 * | 5/2001 | Grassler | A23C 9/156 426/103 |
| 6,279,625 | B1 * | 8/2001 | Ludwig | B65B 39/004 141/301 |
| 6,305,275 | B2 * | 10/2001 | Grassler | A23C 9/156 99/453 |
| 7,559,346 | B2 * | 7/2009 | Herrick | A23C 9/133 141/102 |
| 7,798,182 | B2 * | 9/2010 | Herrick | A23C 9/133 141/105 |
| 8,020,590 | B2 * | 9/2011 | Togni | B65B 39/004 141/104 |
| 8,113,386 | B2 * | 2/2012 | Herrick | A23C 9/133 141/105 |
| 9,505,506 | B2 * | 11/2016 | Ammann | B65B 43/59 |
| 10,299,495 | B2 * | 5/2019 | Moreau | A23G 9/282 |
| 10,507,479 | B2 * | 12/2019 | Bertness | B67D 1/0044 |
| 2005/0058748 | A1 * | 3/2005 | Bourguignon | A23C 19/0765 426/130 |
| 2006/0251783 | A1 * | 11/2006 | D'Esposito | A23G 9/24 426/438 |
| 2011/0200718 | A1 * | 8/2011 | Swertvaegher | A23C 9/00 426/130 |
| 2014/0326360 | A1 * | 11/2014 | Ammann | B65B 43/59 141/9 |

FOREIGN PATENT DOCUMENTS

| | | |
|---|---|---|
| EP | 2177109 | 4/2010 |
| FR | 2708563 | 2/1995 |
| FR | 2914538 | 10/2008 |

* cited by examiner

DEVICE, SYSTEM AND METHOD FOR DOSING A PASTY FOOD PRODUCT WITH SOLID PIECES AND A SAUCE INTO A CONTAINER

CROSS REFERENCE TO RELATED APPLICATIONS

The present application is a National Stage of International Application No. PCT/EP2017/064466, filed on Jun. 13, 2017, which claims priority to European Patent Application No. 16174179.8, filed on Jun. 13, 2016, the entire contents of which are being incorporated herein by reference.

TECHNICAL FIELD

The invention relates to the production of a pasty food product including solid pieces and a sauce. More particularly, the invention also relates to a device for filling a container with a pasty food product including solid pieces and with a sauce. The invention also relates to a system and to a method for producing a pasty food product with solid pieces and a sauce.

BACKGROUND OF THE INVENTION

New pasty food products such as dessert creams or mousses, or dairy products, are continually created to meet the consumer's expectations and to offer new tastes and textures during consumption.

"Pasty" should be understood in a broad and non-restrictive manner. Pasty products comprise semi-liquid, viscous, and semi-solid products. For example, mousses (i.e. aerated food compositions) based on dairy products (i.e. milk food products), in the form of a foam obtained by whipping air or gas into a dairy base, are well known in the art. Their aerated texture is highly appreciated by the consumers.

A sauce may be added to a packaged pasty food product. A sauce corresponds to any fluid, semi-liquid or viscous product added to the pasty food product, for example caramel sauce, fruit coulis, chocolate sauce, vanilla sauce, coffee sauce, mint sauce or any flavored sauce commonly used in the culinary field.

If the sauce is introduced into a product container before introduction of the pasty food product, the sauce is provided at the bottom of the container, under the pasty food product. If the sauce is introduced in a product container after introduction of the pasty food product, the sauce is provided above the pasty food product. The pasty food product and the sauce may be co-dosed into the container, i.e. simultaneously dosed to distribute the sauce within the height of the pasty product. In the devices and methods for co-dosing a pasty product and a sauces according to the prior art, the stream of pasty product and the stream of sauce are each divided in several sub-streams. Each sub-stream is provided to a different outlet of a distribution nozzle, so that outlets which distribute the sauce alternate with outlets which distribute the pasty food product. This makes it possible to form vertical or helical threads of sauce in the final product. Devices in which the streams of products are divided in sub-streams provided to outlets of a nozzle are disclosed for example in documents FR2914538, FR2708563, EP2177109 and EP1518465.

It may also be desirable to add solid pieces into the product, to provide the consumer with different textures, for example to make the crunchiness of solid pieces contrast with the softness of the pasty product, and/or the lightness of a mousse.

The term "solid pieces" refers to any non-fluid inclusions that could be added in the pasty food product. Solid pieces may be selected, for instance, from dried or fresh nut pieces, or fruit pieces. Because of the solid pieces in the pasty food product, the product cannot be delivered through a nozzle having small distribution outlets. Indeed, there is a risk that the solid pieces may clump together and block small distribution outlets. In addition, the division of the stream of pasty food product into several sub-streams to feed several outlets of the nozzle is not possible, at least because the dimension of the nozzle is limited by the dimension of the container into which the product is to be dosed.

It is thus desirable to provide a device that makes it possible to obtain a packaged pasty food product comprising solid pieces and a sauce, where the sauce is distributed within the height of the product, e.g. in two or more helical threads in the pasty product with solid pieces.

SUMMARY OF THE INVENTION

According to a first aspect of the invention, there is provided a device for dosing into a container a pasty food product including solid pieces and a sauce. The device comprises an metering nozzle. The metering nozzle comprises a main outlet, and at least two peripheral outlets situated at a periphery of the main outlet. The metering nozzle comprises a first channel adapted for providing the pasty food product with solid pieces to the main outlet, and at least a second channel for providing the sauce to each peripheral outlet. The device comprises a support for holding the container to be filled from the nozzle. The device is configured so that the metering nozzle and the support have a relative movement such that the nozzle follows a path around a central axis of the support.

Thanks to this device, the sauce may be distributed within the height of the final packaged product, for example helically, while the product into which the sauce is distributed is a pasty product with solid pieces which needs to be dosed through a large outlet. For example, the device makes it possible to obtain vanilla mousse with pecan inclusions packaged in a container, with a caramel sauce helically distributed within the height of the container. Another final product may be, for example a chocolate mousse with macadamia inclusions and caramel sauce.

The path around the central axis of the support may circular or substantially circular, or helical, or substantially helical.

To obtain the relative movement between the nozzle and the support, the nozzle may be movable, while the support is fixed. In another variant embodiment, the support may be rotatable, while the nozzle is fixed. The nozzle and the support may be both movable. Preferably, the support may be rotatable while the nozzle is movable along a vertical axis.

The main outlet may have an area equal or superior to five times the area of each peripheral outlet, preferably comprised between five and twenty times the area of each peripheral outlet and more preferably between five and twelve times the area of each peripheral outlet.

In embodiments, the main outlet may be substantially circular with a diameter comprised between 10 mm and 30 mm, such as between 15 mm and 25 mm.

For example each of the peripheral outlets may have an area comprised between 8 $mm^2$ and 20 $mm^2$.

In an embodiment of the invention, the nozzle comprises exactly two peripheral outlets. In such a case, the nozzle extending along a main axis, an arc defined between the two peripheral outlets may subtend an angle at the main axis comprised between 30° and 90° and preferably between 45° and 60°.

In an embodiment wherein the nozzle extends along a nozzle axis, the nozzle may be rotatably adjustable around said nozzle axis (N).

According to a second aspect of the invention, there is provided a system comprising a device as previously described, the system further comprising:
- a first line for providing the a pasty food product with solid pieces to said device successively comprising:
- a pump for pumping a pasty food product in the first circuit;
- a dynamic mixer for mixing solid pieces into the pasty food product;
- at least one dosing piston adapted to feed the device with a pasty product with solid pieces; and
- a second line for providing the sauce to said device.

The system may further comprise, between the pump and the dynamic mixer, a whipper for aerating the pasty food product.

According to an embodiment, the system may comprise four to ten devices for filling a container with a pasty food product with solid pieces and a sauce, each device being fed by a corresponding dosing piston for dosing said pasty product with solid pieces.

The pump may be a piston pump or an eccentric screw pump.

According to a third aspect of the invention, there is provided a method for producing a pasty food product with solid pieces and a sauce comprising:
- providing a system as previously described;
- pumping a composition containing a milk-based component and a stabilizer to the whipper;
- whipping the composition containing a milk-based component and a stabilizer with a gas to provide a mousse;
- mixing a liquid preparation containing solid pieces, into the mousse, to form a mousse with solid pieces;
- feeding the device for dosing a pasty food product including solid pieces and a sauce with: (a) the mousse with solid pieces as said pasty food product with solid pieces via said first line; and (b) the sauce via said second line.

DETAILED DESCRIPTION

Figure 1:
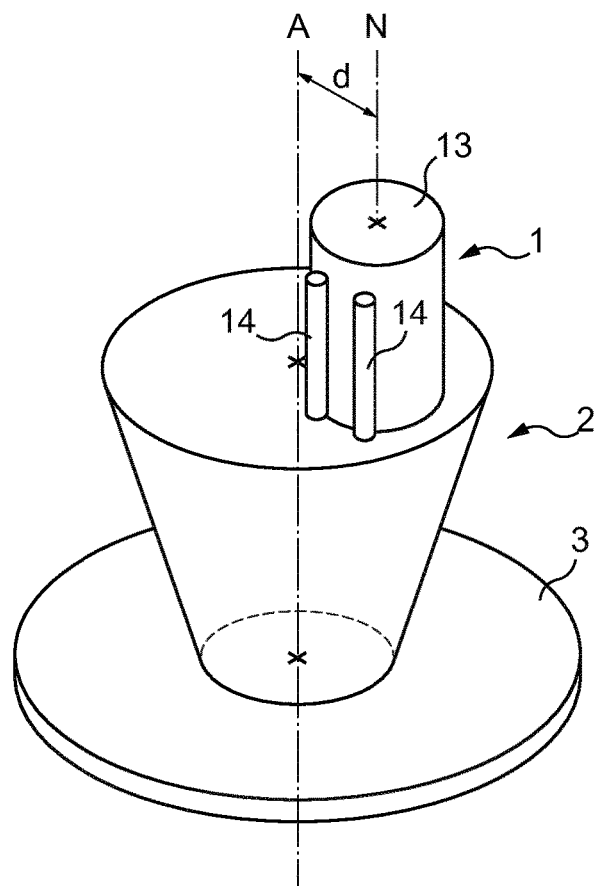
FIG. 1 is a an illustrative view of a device for dosing a pasty food product with solid pieces into a container, with a sauce distributed within the height of the packaged product, according to an embodiment of the invention.
Figure 2:
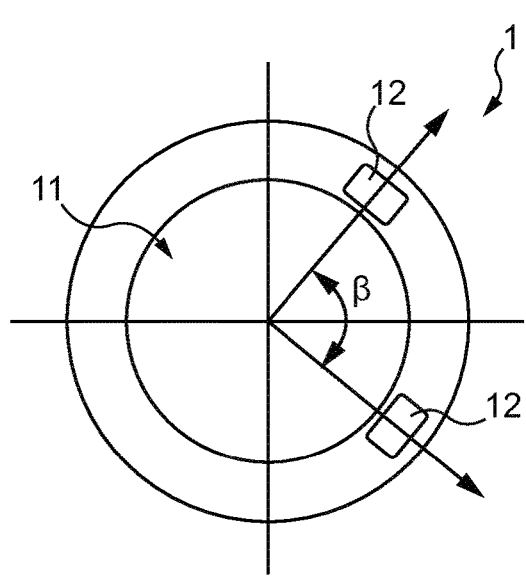
FIG. 2 is a schematic representation of the outlet of a nozzle seen from below, which may be used in the invention.
Figure 3:
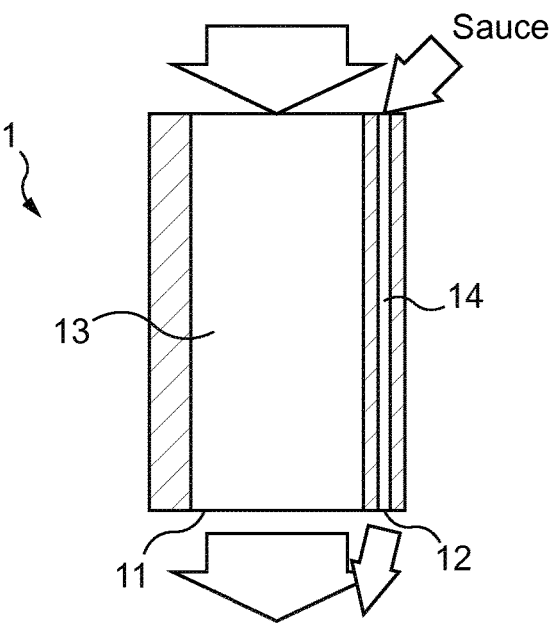
FIG. 3 is a schematic view in cross-section of the nozzle of FIG. 2.

FIG. 1 illustrates a device for dosing a pasty food product with solid pieces and a sauce, into a container. The device of FIG. 1 comprises an metering nozzle 1 some details of which are shown schematically in FIG. 2 and FIG. 3.

The metering nozzle 1 comprises a main outlet 11. The main outlet 11 is provided with a pasty product comprising solid pieces, via a first channel 13. The main outlet 11 and the first channel 13 have a sufficient size (e.g. a sufficient diameter) to avoid any risk of obstruction by solid pieces comprised in the pasty product. As previously explained, the term "solid pieces" refers to any non-fluid inclusions that could be added to the pasty food product. Solid pieces may be selected, for instance, from dried or fresh nut pieces, or dry or candied fruit pieces, or chocolate chips. Nut is understood according to the common usage of the term, and refers, for instance, to walnut, hazelnut, pecan, macadamia, almond, pistachio, Brazil nut, cashew, peanut, etc. Fruit is understood according to the common usage of the word and refers, for instance, to apple, pear, strawberry, raspberry and other berries, cherry, mango, banana, peach, apricot and others.

A solid piece as contemplated in the invention, in particular a nut piece or a fruit piece, may have an average diameter of 6 to 13 mm. The maximum size of the solid pieces (e.g. nuts) may be significantly higher than the average size, and may for example be up to 18 mm.

For example, the main outlet 11 (or main hole of the nozzle) and the first channel 13 may be configured to have a diameter or transverse measurement of at least twice the average size of the solid pieces included in the pasty product to deliver. If the main outlet 11 or the cross section of the first channel 13 is not circular, it may be sized to comprise a circle (inscribed circle) having a diameter of at least at least twice the average size of the solid pieces included in the pasty product to deliver.

For the above cited solid pieces, a main outlet having a diameter (or an inscribed circle having a diameter) of 6 mm to 30 mm, for example 18 mm, 20 mm or 25 mm, is convenient.

The nozzle comprises at least two peripheral outlets 12 situated at a periphery of the main outlet. The peripheral outlets 12 (or peripheral holes of the nozzle) are provided with a sauce or sauces via second channels 14.

Sauces can be, for example, a chocolate, vanilla, caramel, coffee, mint, praline or any flavored sauce commonly used in the culinary field, or else a fruit coulis, a fruit puree or a cream dessert.

The sauce has, preferably, a viscosity of 120000 to 180000 mPa·s. Viscosity can be measured, for example, with a Brookfield viscometer, at a temperature of 8° C., a rotation speed of 5 rpm and a cross-shaped probe reference T bar 93.

Preferably, the sauce can have a dry matter content of about 30 to 55% and a Brix degree of about 30° Bx to 55° Bx.

The peripheral outlets 12 are situated in the vicinity of the main outlet 13, preferably as close as possible to said main outlet 11. This makes it possible for the sauce to adhere to the side of the stream of pasty product when it is metered into the container 2. This is in particular the case when the pasty food product is a mousse, i.e. an aerated product, which may be delivered under pressure and expands when it is delivered by the nozzle.

The peripheral outlets may have a small size and the second channels 14 a corresponding small cross-section, as the sauce is a product without solid pieces, contrary to the pasty food product. In addition, a small cross section makes it possible to form threads of sauce in the final product, which may be the desired appearance for said final product.

The term "thread" refers to a rope or a strand of a product, which has a substantively constant cross-section, for instance a round cross-section, is preferably continuous, and which extends substantively over the whole height of the container. For instance, a thread extends over the whole height of a container and has a very small cross-section when compared to the cross-section of the container.

Many forms of peripheral outlets may be contemplated: circular, square, rectangular, etc.

In the embodiment represented in FIGS. 1-5, the nozzle comprises two peripheral outlets. More peripheral outlets 12, for example three, four, five, or six outlets may be provided at the periphery of the main outlet 11. Preferably, the nozzle comprises two, three or four peripheral outlets 12. Advantageously, the peripheral outlets 12 are distributed around one half of the periphery of the main outlet 11 (e.g. in the same half cross-section of a cylindrical nozzle). An angle β of 30° to 90° (relative to a nozzle axis N) may be provided between two peripheral outlets. The angle β, and the distance of the peripheral outlets 12 relative to the central axis A may be adapted to the coefficient of expansion of the pasty food product when it flows out of the nozzle.

The same sauce or different sauces may be provided to each peripheral outlet or groups of peripheral outlets. When a single sauce is provided, it may be distributed for instance through a common channel which splits into as many second channels 14 as needed. If several sauces are provided, second channels 14 of the nozzle are fed from separate sources.

Figure 4:
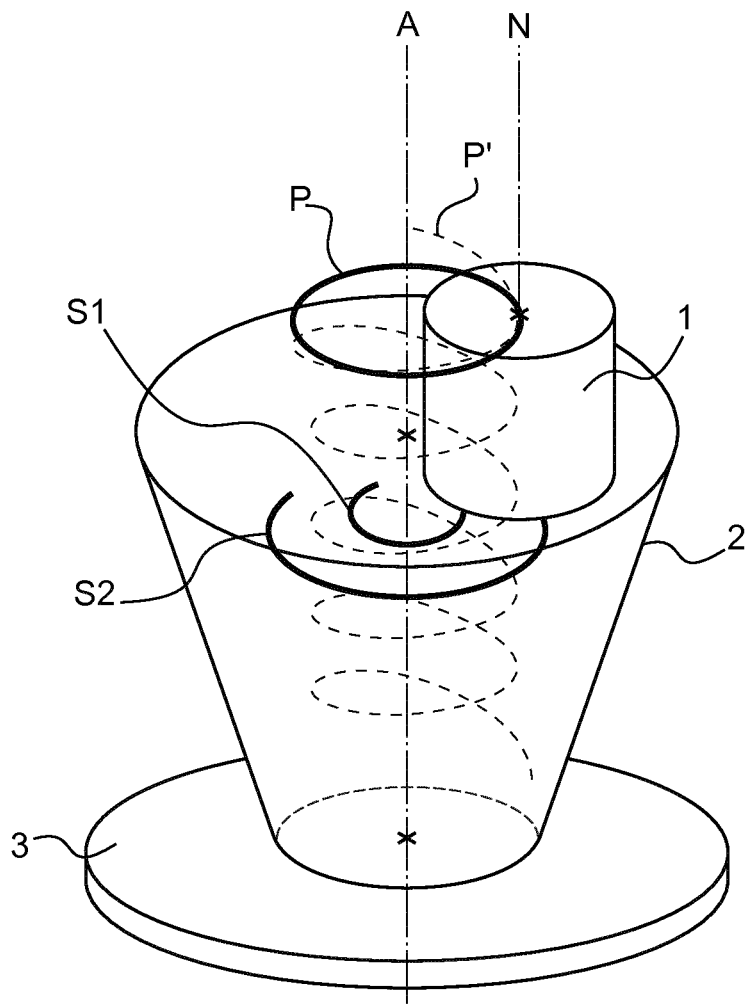
FIG. 4 is a schematic view of the device of FIG. 1 in use.

The device comprises a support 3 for holding a container or receptacle to be filled from the nozzle with the pasty food product with solid pieces and a sauce. The device is configured so that the metering nozzle 1 moves, relative to the support 3, on a path P around a central axis of said support, as shown in FIG. 4. A relative movement between the nozzle 1 and the support 3 (and so the container 4) is thus provided when the device is used to fill the container 2.

In fact, two relative movements may be provided between the nozzle 1 and the support 3. The nozzle may be moved from bottom to top while the container is filled (or the support may be moved from the top to the bottom). This is well known in the prior art of dosing technologies.

In the embodiment represented in FIG. 4, the path P is circular around the central axis A, and the relative movement is caused by a rotation of the support 3 around said central axis A, while the nozzle is fixed. Because the nozzle is offset from the central axis A (in the represented embodiment, the nozzle extends along a nozzle axis N parallel with the central axis A, at a distance d from said central axis A), the nozzle outlet describes a circle around the central axis A which is also the rotation axis of the support 3.

There is also represented in FIG. 4 an alternative path P' which is helical, said path being obtained by the combination of a circular horizontal relative movement of the nozzle 1 around the central axis A and of a vertical relative movement between the nozzle 1 and the support 3.

In another embodiment, the support may be fixed while the nozzle is mobile on the desired path P.

When the support is mobile and the nozzle fixed, the support may have a combined movement of a rotation and a horizontal and/or vertical translation to define a non-circular path.

Of course the means for generating relative horizontal and vertical movements between the nozzle 1 and the support 3 may be the same or not, in other words, the support may fixed or mobile horizontally and vertically, the nozzle may be fixed or mobile horizontally and vertically, and many relative movements, and thus many paths of the nozzle around the central axis A, may be obtained by combination of the movements of the nozzle and/or of the support.

When the device is used, the nozzle is rotationally fixed around the nozzle axis N. However, in some embodiments of the invention, the device is configured so that a rotational adjustment of the nozzle may be performed. The position of the nozzle may in these embodiments be adjusted, mainly for adjusting the position of the peripheral outlets of the nozzle relative to the rest of the device, notably the distance of the peripheral outlets 2 to the central axis A. In the represented embodiment, a rotational adjustment of the nozzle makes it possible to adjust the distance of the peripheral nozzle to the central axis A, and also, at the same time, to modify the distance between the two sauce threads S1, S2 formed in the final packaged product.

Figure 5:
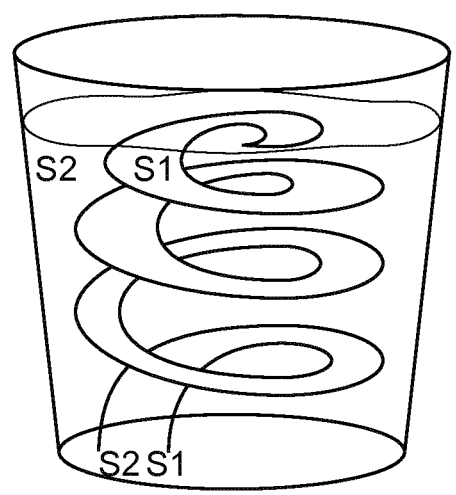
FIG. 5 is a schematic view of a packaged pasty food product with solid pieces and a sauce that may be obtained with a device according to the invention.

When the sauce and the pasty product with solid pieces are introduced at a distance from the central axis A, while the nozzle describes a path around said central axis 1, the sauce forms threads included in the volume (or "mass") of pasty product. The sauce threads S1, S2, may be distributed in the final product as shown in FIG. 5. The sauce threads S1, S2 have the form of two parallel helical threads. For example, the two threads situated respectively at about one third and two thirds of the diameter of a container into which the product is delivered.

The threads may remain substantially parallel from the bottom to the top of the packaged product, except at the very top of the product where the two threads S1, S2 can meet. This particular feature at the top of the product can be obtained at the end of the dosing of the product into the container by quickly lifting the nozzle when the product delivery stops. Because the sauce sticks to the side of the product stream, which is narrowed by the lifting, the two sauce threads S1, S2 meets when the product delivery stops.

A consumer can easily distinguish the sauce from the pasty food product. As will be explained below, the sauce and the pasty food product may have different color, or texture, or viscosity, or overrun.

Figure 6:
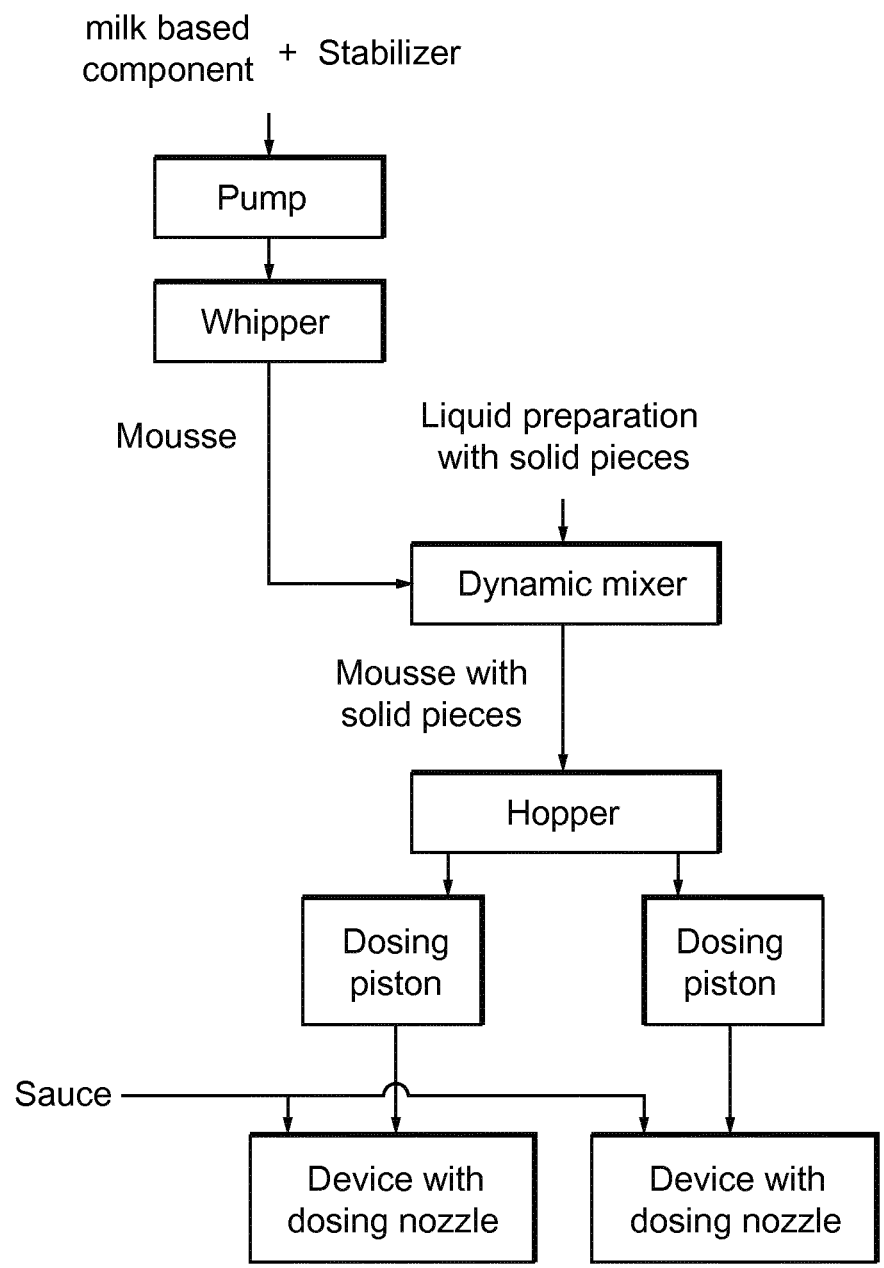
FIG. 6 is a schematic principle representation of a system according to an aspect of the invention.

FIG. 6 represents the operating principles of a system according to an aspect of the invention. In this embodiment, the system comprises two devices each with a dosing nozzle.

The system comprises a device for dosing a pasty food product with solid pieces and a sauce into a container, according to an embodiment of the invention, referred to in FIG. 6 as a "device with dosing nozzle". This device makes it possible to dose a pasty product with solid pieces and a sauce distributed within the height of the product, in particular in the form of two or more helical threads.

The sauce is provided via a dedicated line to the device. The pasty product with solid pieces may be produced and provided in the following manner.

A base product is provided. It may be for example a milk-based component with a stabilizer. A pump feeds a whipper with the base product, where the base product is whipped and aerated, i.e. mixed with a gas such as air to form a mousse (a mousse being a form of pasty product that may be used in the invention), e.g. a dairy mousse component.

The dairy mouse component is a stable aerated food product obtained from a composition of a milk-based component and a stabilizer system. "Aerated" (or "whipped") refers to the incorporation of a gas into a food material. For purposes herein, the gas is not particularly limited, and may be air, nitrogen, carbon dioxide, nitrous oxide, and combinations thereof. The dairy mousse component may be, for example, a chocolate mousse, containing cocoa powder and/or chocolate, or a vanilla mousse, containing vanilla flavour, or a caramel mousse containing caramel.

Any standard equipment—referred as a "whipper" in FIG. 6—used in the chilled dairy industry can be used for aeration, such as, a piece of equipment of the type MON-DOMIX, AEROMIX or HPW (High Pressure Whipping System). A so-obtained typical increase in volume of the dairy mousse also called "Overrun" or "foaming capacity" may be for example of 80% to 140%

By "milk-based component" is meant at least one component selected from whole milk, skimmed milk or partially skimmed milk, optionally reconstituted from milk powder, dairy cream, anhydrous milk fat, milk protein powder, and their mixes.

The stabilizer system provides stability to the dairy mousse, thus helping in maintaining its aerated structure, and can be selected from the group consisting of agar-agar, alginates, carrageenan, caseinates, gelatine, gellan, starches, modified starches, and combinations thereof. The dairy mousse component may also contain at least one emulsifier, and/or usual additives, such as a sugar ingredient, for instance a natural sugar, any sweetener, or flavoring agents.

The mousse is then provided to a dynamic mixer where it is mixed with the desired amount of solid pieces such as nuts.

The solid pieces may be provided in a liquid preparation containing solid pieces.

The preparation containing solid pieces may comprise 20-60 wt % of solid pieces in 40-80 wt % of a liquid carrier, before mixing into the dairy mousse. This preparation can be UHT treated to reduce the bacterial load of the solid pieces, especially when solid pieces are nut pieces. For instance, the liquid carrier comprises water, sugar and a stabiliser system. Preferably, the preparation containing solid pieces comprises 20-45 wt % of solid pieces, 40-55 wt % of water, 15-25 wt % of sugar, and 1-2 wt % of stabiliser system. The stabiliser system comprises hydrocolloids, such as modified starch, xanthan gum and/or guar gum. The stabiliser system may also comprise an emulsifier, such as monoglycerides.

It is desirable that said preparation contains a high proportion of solid piece. The high content of solid pieces in the preparation is needed to incorporate a maximum of pieces in the final dessert product, without destroying the texture and the organoleptic properties of the dairy product, especially if this is a mousse.

Preferably, the final dessert product contains from 2 to 15 wt % of solid pieces, preferably from 4 to 10 wt %. The amount of solid pieces in the final dessert product can be determined by sieving. Sieving is performed according to a standard laboratory method using a sieving equipment, over a 1 mm sieve. A predetermined amount of the preparation is rinsed for 2 min before sieving and sieve vibration takes 1 min.

At the outlet of the dynamic mixer, the mousse comprises homogenously distributed solid pieces, and thus forms a pasty product with solid pieces.

The mousse with solid pieces is provided to a hopper. The hopper forms an intermediate reservoir which is able to feed one or several devices for filling containers with the pasty food product with solid pieces. The hopper has a volume which is sufficient to feed the devices for filling containers without the risk of a product shortage. For example, each dosing piston has a dosing volume (which may be the same for each dosing piston), and the intermediate reservoir (e.g. provided by the hopper) has a volume greater than the sum of the dosing volumes of the dosing pistons of the system.

In a particular embodiment, the dynamic mixer and the hopper or intermediate reservoir may be formed by a single apparatus. In other words, the dynamic mixer may be located in the hopper.

The pasty food product with solid pieces may be pumped with dosing piston pumps (typically one dosing piston for each device).

In particular, the pasty food product with solid pieces is provided to the first channel 13 and main outlet 11 of the nozzle 1 of each device. A given quantity of the pasty food product with solid pieces flows from the nozzle each time the dosing piston is actuated. This quantity may advantageously correspond to the quantity desired in each container to be filled.

Advantageously, the transport pipes between the dynamic mixer and the device for dosing into a container a pasty food product with solid pieces and a sauce may have a constant inside diameter. Generally speaking, any obstacle, recess or unrounded corner should be avoided in said transport pipes to avoid obstruction by solid pieces contained in the transported pasty food product.

The sauce is provided to the device for dosing into a container a pasty food product with solid pieces and a sauce via an independent, dedicated line, and is provided to the second channels 14 and the peripheral outlets of the nozzle. Many types of pumps may be contemplated for the delivery of the sauce.

The delivery of the sauce has to be synchronized with the delivery of pasty food product into the container. The delivery of the sauce advantageously starts at the same time as the delivery of pasty food product by the nozzle 1. The delivery of the sauce advantageously stops at the end or shortly after the end of the delivery of pasty food product by the nozzle 1. Other synchronization schemes may be contemplated. For example, the delivery of the sauce may be started and stopped several times when filling a single container, for providing the final packaged product with a sauce.

The device, system and method provided in the invention thus make it possible to produce a packaged product comprising a pasty food product with solid pieces and a sauce distributed within the height of the packaged product with a desired pattern, for example in the form of several threads around the pasty product or included in the mass of said pasty product.

Any reference to prior art documents in this specification is not to be considered an admission that such prior art is widely known or forms part of the common general knowledge in the field.

As used in this specification, the words "comprises", "comprising", and similar words, are not to be interpreted in an exclusive or exhaustive sense. In other words, they are intended to mean "including", but not limited to.

Although the invention has been described by way of example, it should be appreciated that variations and modifications may be made without departing from the scope of the invention as defined in the claims. Furthermore, where known equivalents exist to specific features, such equivalents are incorporated as if specifically referred to in this specification.

The invention claimed is:

1. A device for dosing into a container a pasty food product including solid pieces and a sauce, the device comprising:
    a metering nozzle, wherein the metering nozzle comprises:
        a main outlet;

at least two peripheral outlets situated at a periphery of the main outlet;
a first channel adapted for providing the pasty food product with solid pieces to the main outlet, wherein at least one of the main outlet or a cross section of the first channel has a configuration selected from the group consisting of (i) circular and having a diameter of at least twice the average size of the solid pieces included in the pasty product and (ii) not circular but sized to comprise an inscribed circle having a diameter of at least twice the average size of the solid pieces included in the pasty product; and
a second channel for providing the sauce to each of the at least two peripheral outlets; and
a support for holding the container to be filled from the metering nozzle; and
the device being configured so that the metering nozzle and the support have a relative movement such that the metering nozzle follows a path around a central axis of the support.

2. The device according to claim 1, wherein the path around the central axis of the support has a shape selected from the group consisting of circular or substantially circular, helical, and substantially helical.

3. The device according to claim 1, wherein the metering nozzle is movable while the support is fixed.

4. The device according to claim 1, wherein the support is rotatable while the metering nozzle is fixed.

5. The device according to claim 1, wherein the main outlet has an area equal or superior to five times the area of each peripheral outlet of the at least two peripheral outlets.

6. The device according to claim 1, wherein the main outlet is substantially circular and has a diameter between 10 mm and 30 mm.

7. The device according to claim 1, wherein each peripheral outlet of the at least two of the peripheral outlets have an area between 8 mm² and 20 mm².

8. The device according to claim 1, wherein the at least two of the peripheral outlets of the metering nozzle comprise exactly two peripheral outlets.

9. The device according to claim 8, wherein the metering nozzle extends along a main axis, and wherein an arc defined between the at least two peripheral outlets subtends an angle at the main axis between 30° and 90°.

10. The device according to claim 1, wherein the metering nozzle extends along a nozzle axis, the metering nozzle being rotatably adjustable around the nozzle axis.

11. A system comprising:
a device for dosing into a container a pasty food product including solid pieces and a sauce, the device comprising:
a metering nozzle, wherein the metering nozzle comprises:
a main outlet; and
at least two peripheral outlets situated at a periphery of the main outlet;
a first channel adapted for providing the pasty food product with solid pieces to the main outlet, wherein at least one of the main outlet or a cross section of the first channel has a configuration selected from the group consisting of (i) circular and having a diameter of at least twice the average size of the solid pieces included in the pasty product and (ii) not circular but sized to comprise an inscribed circle having a diameter of at least twice the average size of the solid pieces included in the pasty product; and
a second channel for providing the sauce to each of the at least two peripheral outlets; and
a support for holding the container to be filled from the metering nozzle; and
the device being configured so that the metering nozzle and the support have a relative movement such that the metering nozzle follows a path around a central axis of the support;
a first line for providing the pasty food product with solid pieces to the device successively, the first line comprising:
a pump for pumping the pasty food product into the first line;
a dynamic mixer for mixing the solid pieces into the pasty food product; and
at least one dosing piston adapted to feed the device with the pasty product including solid pieces; and
a second line for providing the sauce to the device.

12. The system according to claim 11, it further comprising a whipper for aerating the pasty food product, the whipper positioned between the pump and the dynamic mixer.

13. The system according to claim 11, wherein the device for dosing is a first device, the system further comprising three to nine additional devices for filling the container with the pasty food product with solid pieces and the sauce, wherein each of the three to nine additional devices are fed by a corresponding dosing piston for dosing the pasty product including solid pieces.

14. The system according to claim 11, wherein the pump is a piston pump or an eccentric screw pump.

15. A method for producing a pasty food product with solid pieces and a sauce, the method comprising:
(i) a providing a system comprising:
a device for dosing into a container a pasty food product including solid pieces and a sauce, the device comprising:
a metering nozzle, wherein the metering nozzle comprises:
a main outlet;
at least two peripheral outlets situated at a periphery of the main outlet;
a first channel adapted for providing the pasty food product with solid pieces to the main outlet, wherein at least one of the main outlet or a cross section of the first channel has a configuration selected from the group consisting of (i) circular and having a diameter of at least twice the average size of the solid pieces included in the pasty product and (ii) not circular but sized to comprise an inscribed circle having a diameter of at least twice the average size of the solid pieces included in the pasty product; and
a second channel for providing the sauce to each of the at least two peripheral outlets; and
a support for holding the container to be filled from the metering nozzle; and
the device being configured so that the metering nozzle and the support have a relative movement such that the metering nozzle follows a path around a central axis of the support;
a first line for providing the pasty food product with solid pieces to the device successively, the first line comprising:
a pump for pumping the pasty food product into a whipper;
a dynamic mixer for mixing the solid pieces into the pasty food product; and at least one dosing piston adapted to feed the device with the pasty product including solid pieces; and
a second line for providing the sauce to the device;
(ii) pumping a composition containing a milk-based component and a stabilizer to the whipper;
(iii) whipping the composition containing a milk-based component and a stabilizer with a gas to provide a mousse;
(iv) mixing, in the dynamic mixer, a liquid preparation containing solid pieces, into the mousse, to form pasty food product with solid pieces; and
(v) feeding the first line of the device for dosing with the pasty food product including solid pieces; and
(vi) feeding the second line of the device for dosing with the sauce.

16. The method according to claim 15, further comprising rotating the support around the central axis of the support while feeding the first line of the device and feeding the second line of the device, wherein the nozzle is offset from the central axis.

17. The method according to claim 15, wherein the solid pieces have an average diameter between 6 mm to 13 mm.

18. The method according to claim 15, wherein the diameter or transverse measurement of the main outlet and the first channel is between 12 mm and 30 mm.

* * * * *